(12) United States Patent
deKozan et al.

(10) Patent No.: US 9,760,880 B2
(45) Date of Patent: Sep. 12, 2017

(54) FACILITATING CASH PAYMENT FOR TRANSIT MOBILE APPLICATIONS

(71) Applicant: Cubic Corporation, San Diego, CA (US)

(72) Inventors: David L. deKozan, San Diego, CA (US); David Blue, Clayton, CA (US); Ken Shreve, Chicago, IL (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 15/058,487

(22) Filed: Mar. 2, 2016

(65) Prior Publication Data

US 2016/0260075 A1    Sep. 8, 2016

Related U.S. Application Data

(60) Provisional application No. 62/127,125, filed on Mar. 2, 2015.

(51) Int. Cl.
*G06Q 20/20* (2012.01)
*G01S 19/13* (2010.01)
(Continued)

(52) U.S. Cl.
CPC ............ *G06Q 20/204* (2013.01); *G01S 19/13* (2013.01); *G06Q 20/045* (2013.01); *G06Q 20/28* (2013.01);
(Continued)

(58) Field of Classification Search
CPC ........ G06Q 20/20; G06Q 20/32; G06Q 20/12; G06Q 20/22; G06Q 20/3274; G06Q 20/204
(Continued)

(56) References Cited

U.S. PATENT DOCUMENTS 8,856,045 B1 * 10/2014 Patel .................. G06Q 20/3823
                                                                 705/64
2002/0032651 A1 * 3/2002 Embrey ................ G06Q 20/02
                                                                 705/40

(Continued)

FOREIGN PATENT DOCUMENTS

EP            1069539 A2    1/2001

OTHER PUBLICATIONS

International Search Report and Written Opinion dated May 2, 2016 for PCT/US2016/020460, filed Jul. 14, 2000; all pages.

*Primary Examiner* — Vanel Frenel
(74) *Attorney, Agent, or Firm* — Kilpatrick Townsend and Stockton, LLP

(57) ABSTRACT

A method for facilitating bankless cash payments includes determining that a mobile device is within a threshold distance of a particular retail system and receiving a selection of a transit product or a stored value amount to be added to the virtual account. The method may also include providing the selection to a transit system and receiving, from the transit system, a code based on the selection. The code may include an amount to be tendered for the selection to be added to the virtual account. The method may further include providing the code to the particular retail system and receiving the transit product or the stored value amount on the mobile device from the transit system. The transit product or the stored value amount may be received upon the transit system receiving an indication from the retail system that the amount was tendered for the selection.

20 Claims, 6 Drawing Sheets

(51) Int. Cl.
  *G06Q 20/32* (2012.01)
  *G06Q 20/04* (2012.01)
  *G06Q 20/36* (2012.01)
  *G06Q 20/28* (2012.01)

(52) U.S. Cl.
  CPC ..... *G06Q 20/3224* (2013.01); *G06Q 20/3274* (2013.01); *G06Q 20/3278* (2013.01); *G06Q 20/36* (2013.01)

(58) Field of Classification Search
  USPC .................. 705/17, 16, 44, 39, 35, 21, 26.1; 235/379, 380
  See application file for complete search history.

(56) References Cited

U.S. PATENT DOCUMENTS

| | | | |
|---|---|---|---|
| 2007/0295803 A1* | 12/2007 | Levine | G06Q 20/04 235/379 |
| 2008/0208681 A1* | 8/2008 | Hammad | G06Q 20/045 705/13 |
| 2010/0250290 A1* | 9/2010 | Lefkowitz | G06Q 10/02 705/5 |
| 2012/0150669 A1* | 6/2012 | Langley | G06Q 30/0601 705/16 |
| 2012/0158589 A1* | 6/2012 | Katzin | G06Q 20/12 705/44 |
| 2013/0018740 A1* | 1/2013 | Fisher | G06Q 20/20 705/18 |
| 2013/0024364 A1* | 1/2013 | Shrivastava | G06Q 20/38 705/39 |
| 2013/0041811 A1* | 2/2013 | Vazquez | G06Q 40/02 705/39 |
| 2014/0279537 A1* | 9/2014 | Cicoretti | G06Q 20/322 705/44 |
| 2015/0058145 A1* | 2/2015 | Luciani | G06Q 20/3274 705/17 |
| 2015/0120428 A1* | 4/2015 | Hardison | G06Q 20/425 705/14.33 |

* cited by examiner

FACILITATING CASH PAYMENT FOR TRANSIT MOBILE APPLICATIONS

CROSS-REFERENCES TO RELATED APPLICATIONS

This application claims priority to U.S. Provisional Patent Application No. 62/127,125 filed Mar. 2, 2015, entitled "FACILITATING CASH PAYMENT FOR TRANSIT MOBILE APPLICATIONS," the entire disclosure of which is hereby incorporated by reference, for all purposes, as if fully set forth herein.

BACKGROUND OF THE INVENTION

Mobile ticketing is growing in popularity as a means to facilitate convenient ticket purchases and fare payments for bus and rail riders. Current mobile purchasing models primarily center on an e-commerce model where purchases are billed to a registered credit card or processed through a cloud wallet service like PayPal® or Google Checkout®. While these mechanisms may work for riders with banking relationships, those who have none or do not wish to use one on a mobile device are left out. This can pose major problems, as in some transit systems a vast majority of transit riders do not have and/or use a bank account or credit account to purchase transit fare, instead opting to utilize cash payments.

Transit retail networks have typically been set up to allow convenient locations for bus riders to top up their smart cards and/or to purchase passes and travel products. The imposition on store owners has included the use of hardware with specialty applications that require training for clerks to be able to key in desired stored value amounts, pass types, ticket types, and the like.

BRIEF SUMMARY OF THE INVENTION

Embodiments of the invention provide systems and methods for facilitating cash payments that may be used to fund a prepaid account. The account may be accessed using a mobile device, which may then be used as a mobile payment media or to top up other smart cards or other media linked to authorized accounts for the purpose of gaining access to a transit system and pay for transit rides.

In one aspect, a method for facilitating bankless cash payments is provided. The method may include determining that a mobile device is within a threshold distance of a particular retail system and receiving a selection of a transit product or a stored value amount to be added to the virtual account. The method may also include providing the selection to a transit system and receiving, from the transit system, a code based on the selection. The code may include an amount to be tendered for the selection to be added to the virtual account. The method may further include providing the code to the particular retail system and receiving the transit product or the stored value amount on the mobile device from the transit system. The transit product or the stored value amount may be received upon the transit system receiving an indication from the retail system that the amount was tendered for the selection.

In another aspect, a non-transitory computer-readable medium having instructions embedded thereon for facilitating bankless cash payments is provided. The instructions may include computer code for causing a computing device to determine that a mobile device is within a threshold distance of a particular retail system and to receive a selection of a transit product or a stored value amount to be added to the virtual account. The instructions may also include computer code for causing a computing device to provide the selection to a transit system and to receive, from the transit system, a code based on the selection. The code may include an amount to be tendered for the selection to be added to the virtual account. The instructions may further include computer code for causing a computing device to provide the code to the particular retail system and to receive the transit product or the stored value amount on the mobile device from the transit system. The transit product or the stored value amount may be received upon the transit system receiving an indication from the retail system that the amount was tendered for the selection In another aspect, a mobile device for facilitating bankless cash payments is provided. The mobile device may include a display, a communications interface a memory, and a processor. The processor may be configured to determine that a mobile device is within a threshold distance of a particular retail system and to receive, using the communications interface, a selection of a transit product or a stored value amount to be added to the virtual account. The processor may also be configured to provide, using the communications interface, the selection to a transit system and to receive, from the transit system using the communications interface, a code based on the selection. The code may include an amount to be tendered for the selection to be added to the virtual account. The processor may be further configured to provide, using the communications interface, the code to the particular retail system and to receive, using the communications interface, the transit product or the stored value amount on the mobile device from the transit system. The transit product or the stored value amount may be received upon the transit system receiving an indication from the retail system that the amount was tendered for the selection.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
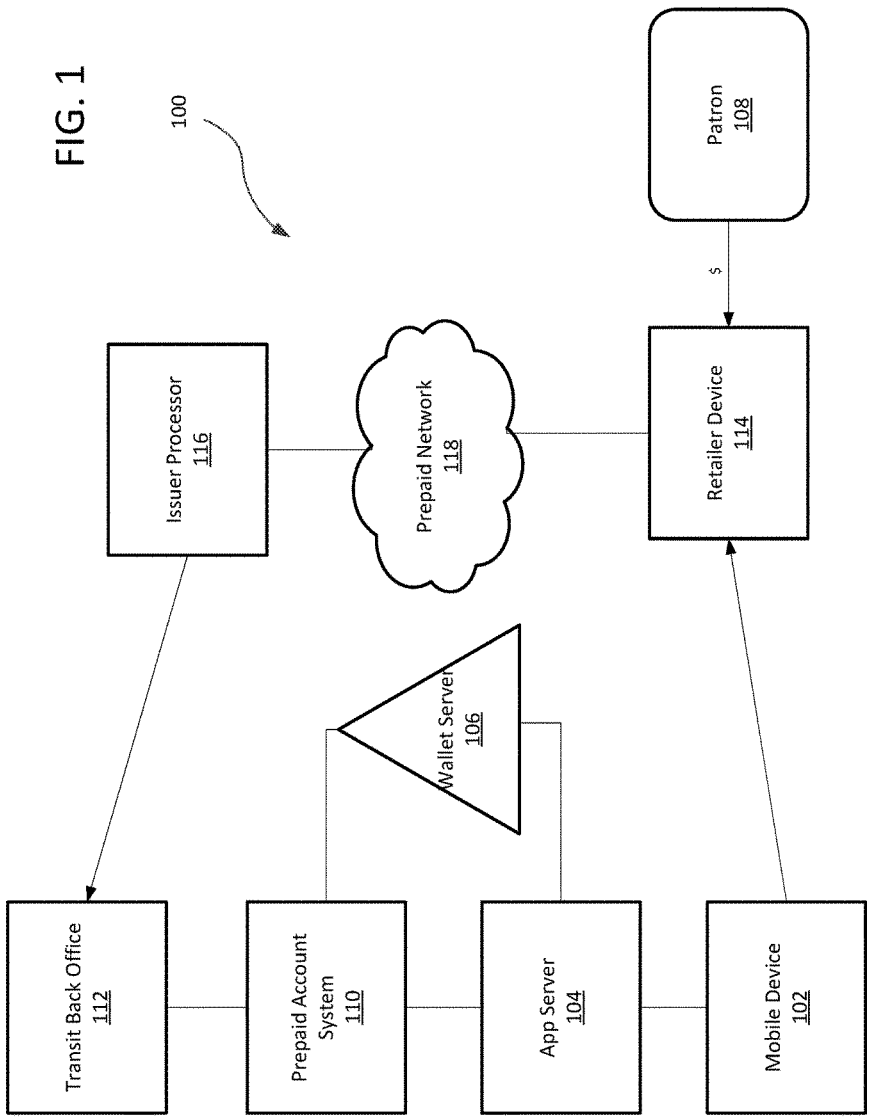
FIG. 1 depicts a system for facilitating bankless cash payments according to embodiments.

Embodiments of the invention simplify how transit retails networks are set up and minimize both the necessary hardware a retailer would have to take on to act as a "transit agent" as well as the workload and training clerks require to support these activities. Embodiments combine a mobile application and a prepaid card network to establish a "cardless" funding account through which users can deposit cash for later purchases of fare products and transit services. The effect is to create a hosted stored value account that can be accessed by a user's smart phone application to fund purchases of passes, tickets, and/or related transportation products.

Many retailers participate in reloadable prepaid programs and have network connections in place to accept cash and to add funds to prepaid accounts on behalf of prepaid card issuers. Typically these transactions leverage magnetic stripe or barcode technology to register the account to be loaded, thus leveraging existing point of sale (POS) and retail terminals, as well as the associated network connectivity. Accordingly, embodiments of the invention may provide for these same systems and connections to be leveraged in support of a closed loop funding account for transit purchases that is accessible by both mobile and online utilities. Embodiments may also provide a pathway for the account to be "opened" by virtue of the user registering Know Your Customer (KYC) data and requesting a physical payment card that would be tied to the account.

The process of opening the account may commence with the user downloading a transit mobile application (app) from an application database or store. The mobile server controlling the app may connect with a prepaid issuing system that is part of the general purpose prepaid network. As the app is installed, the mobile server may send an account creation request to the prepaid system, which in turn may open a virtual prepaid account on behalf of a bank certified prepaid issuer. The virtual prepaid card may appear in the user's app to denote the existence of the account and provide a means for future management. Loading the account with value for purchases may take place at any number of retail environments or devices, such as but not limited to, connected retailers, at cash accepting kiosks, online retail environments, and the like. Accordingly, embodiments of the invention can allow the app to provide the user with the ability to set up the load amount desired. The load may be a stored value amount, a particular type of ticket, or a pass type (daily, weekly, monthly, zone, etc.).

Further, for stored value, the specified load amount may be converted by the app into a bar code corresponding to a SKU recognizable by the retailers system. By scanning the bar code from the mobile phone screen, the retail system may record the amount of the pending sale and complete the transaction upon the patrons tendering of the payment amount (most likely in cash). Once tendered, the value may be posted to the user's account and made available for future fare product purchases made within the mobile application or via related on-line services. In the event that the retail system does not have the ability to recognize a bar code based SKU, then the user may read out the card number from the mobile app and have the clerk manually enter it to start the process.

For pass products, unique bar codes may be published by the app with corresponding SKU's recognizable by the retailers system. Upon scanning the mobile phone, the recognized SKU may identify the product price and prompt the patron to tender payment. Once the payment has been tendered (most likely in cash) a record may be routed to the mobile server to confirm the sale and the mobile server will either load the product to the fare account or publish it to the app.

For purchases at a kiosk, the user would commence the transaction either by entering the virtual card number displayed in the app or by entering another form of app provided code, such as by scanning a barcode or transferring a data packet using a near field communication (NFC) interface of the mobile device. That code may denote to the kiosk that the pending purchase would be loaded to the account designated by the code. This sequence may also be initiated by the app recognizing a kiosk specific Blue Tooth Low Energy Beacon and commencing a dialogue between the app, the server, and the kiosk. Such a dialogue would minimize steps for the user.

Once the kiosk has commenced a session dedicated to a specific account, the user may select the stored value amount or fare product of choice and tender payment via standard kiosk navigation. Once the payment is tendered (most likely in cash) the stored value would be routed to the users account. For tickets and passes, the products may be routed to the mobile server either for posting to the users account of for delivery to the users card via NextLink/VPOS (virtual point of sale). While discussed largely in the context of transit fare cards, it will be appreciated that the systems and methods described herein may be utilized in any applications where cash payments are to be used to fund prepaid cards or accounts.

Turning now to FIG. 1, a system 100 for topping up a virtual transit account is shown. System 100 may include a user's mobile device 102 that may download and install a mobile application from an application server 104. The mobile application may allow the mobile device 102 to utilize funds in a virtual prepaid account to pay for transit rides. The mobile application may receive registration information, such as KYC data, from patron 108 and may then leverage a mobile wallet application maintained by a wallet server 106 to create a virtual account on a prepaid account system 110 and link the account to the mobile wallet application and a transit account maintained by a transit back office 112. In some embodiments, payment data, such as credit/debit card information and/or bank account information, may be provided by the wallet server 106 to the prepaid account system 110, while in other embodiments the prepaid account system is funded entirely by separate cash payments and no separate account data is required.

To fund the account using cash payments, the patron 108 may approach a retail device 114, such as a merchant POS device, transit kiosk, and/or other manned or unmanned device capable of receiving cash payments. Using the mobile application, the user may select a transit product and/or stored value amount to add to either the virtual account or the transit account. The selection may be provided to the transit back office 112, which may generate and provide a code to the mobile application that represents the product and/or amount, as well as indicates an amount of cash that the patron 108 must tender to the retail device 114 to purchase the funds and/or product. The mobile application may then provide the code to the retail device 114. For example, the code may be a QR code, barcode, or other identifier that allow the retail device 114 to associate the selected product and/or amount with a SKU or other retail identifier. In some embodiments, each retail device 114 and/or merchant system may have its own unique set of codes that may correspond to a SKU within that merchant's POS system. The retail device 114 may then look up the appropriate selection and prompt the patron 108 to provide the necessary cash payment.

Upon receiving the payment, the retail device 114 may provide the transit back office 112 and/or an issue processor 116 with an indication of the payment. The payment may be routed through the prepaid account network 118 to the issue processor to fund a the patron's prepaid virtual account in the amount of the stored value and/or transit product. The selected transit product and/or stored value amount may then be credited to the transit account maintained by the transit back office 112. Data on the mobile application (or in some embodiments, a physical transit card) may be updated to allow the mobile device 102 to access the transit account and transit product associated therewith. The mobile device 102 may then be used as a transit fare media, such as by communicating with an access point of a transit system using the device's NFC interface and/or by producing a readable identifier, such as a barcode or QR code, that may be scanned at the access point. The communication may allow a ride or stored value amount to be deducted from the transit account based on the cost of a transit ride. Other media that may be registered to the transit account and capable of authentication by the fare terminal can similarly facilitate transit access/payment enabled through the mobile sales process.

While described here with several different servers and entities, it will be appreciated that functionality of one or more of the servers may be combined. For example, a transit system server may be used to host the mobile application downloads, the mobile wallet server, the prepaid accounts, and back office functions.

Figure 2:
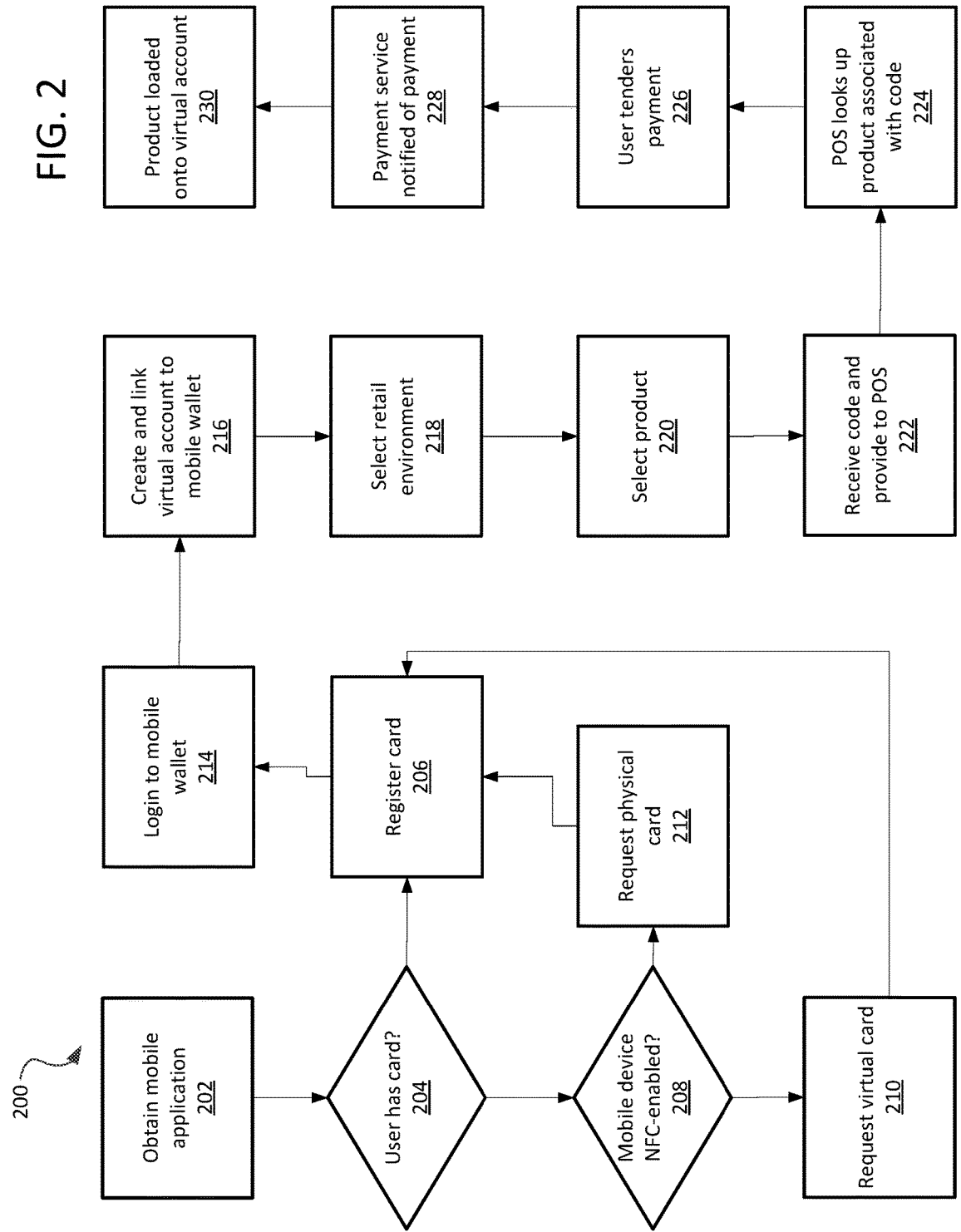
FIG. 2 is a flowchart depicting a process for facilitating bankless cash payments according to embodiments.

FIG. 2 depicts a flowchart of one embodiment of a process 200 of setting up and loading up a virtual account. A new user may discover and obtain a mobile transit application at block 202. For example, the user may locate the application on an application database or store. The user may download and install the application on his mobile device. At block 204, a determination is made whether the user has a transit card that is associated with a transit account maintained by a transit system, such as by the back office. The transit account may be loadable with transit products, including stored value transit products, a number of rides, monthly passes, and the like. Oftentimes, transit products may be purchased and added to the transit account at a transit vending machine or ticket office, however, as described below, other retail establishments may provide opportunities to purchase transit products by leveraging a prepaid account system. This is of particular value to bus riders who do not have ready access to cash accepting kiosks.

If the user has a preexisting transit card, the transit card is registered within the application at block 206. If the user does not have a transit card, a transit card must be ordered. To complete the ordering process, a determination may be made as to whether the user's mobile device is NFC enabled may be made at block 208. If yes, a virtual transit card (V-card) may be requested and provisioned to the mobile device at block 210. If not, a physical transit card may be ordered at block 212. Ordering a physical transit card may be done, for example, using an online web or app-based ordering system, an interactive voice response system (IVR), mail order, and/or other ordering system. The physical transit card may then be delivered or picked up by the user. For example, the user may be able to order or otherwise request a transit card from a retail provider. Physical and virtual transit cards carry the same types of data, with each having an identifier associated with a corresponding transit account and/or product details stored on the card itself. The physical transit card may be a contactless smart card, mag stripe card, or the like, where the storage medium includes a token or identifier associated with the transit account. Likewise, the same token or identifier may be stored on a memory device of a user's mobile device such that the identifier may be communicated using an interface such as NFC.

Upon possession of a transit card, physical, virtual, and/or previously owned, the user may register the transit card for use with the mobile application at block 206. This may be done by entering user (KYC data, etc.) and/or card information into the mobile application and/or other registration source, such as a registration webpage. During registration of the transit card, the corresponding transit account may be linked to the mobile application. If a user has a payment source they wish to use for funding the transit card, payment details, such as a credit/debit card number, bank account number, and the like, may also be entered. In embodiments where a user does not wish to register a payment source, the user may select and login to a mobile payment wallet from the mobile application at block 214. Within the mobile payment wallet, a prepaid account setup icon may be displayed. Upon the user pressing the icon, the prepaid account setup is launched and a virtual prepaid account is created using the registration information provided by the user. This virtual account is then linked to the mobile payment wallet and the transit account at block 216. Once the virtual account is active, a user may add funds to the account using a linked payment source, such as a credit card or bank account. The virtual account is oftentimes a virtual prepaid account maintained by an issuer system, such as a bank, financial institution, and/or related entity. The virtual prepaid account is used merely to load and store funds that a user has added, such as by initiating a cash purchase as described herein.

For users that do not have and/or do not wish to use a card or account to fund the virtual account, retail environments may be available for making cash deposits to the virtual account. Retail environments may include retail and other store POS devices, kiosks, vending machines, and/or other devices that are configured to accept cash payments and may be networked to communicate with a virtual account server. The user may approach a retail environment and select the particular retail environment on the mobile application at block 218. In some embodiments, the mobile application may leverage a Bluetooth® low energy (BLE) or other wireless interface to communicate with a beacon of the retail environment. For example, a user may walk into a store that participates in topping up the virtual account, and the user's mobile device may communicate with a beacon at a POS device of the store. The detection of the beacon may cause the mobile application to "wake up" and/or launch. The mobile application may then collect global positioning satellite (GPS) data, such as coordinates, from the mobile device's sensors and transmit this data to the virtual account server, which then determines which retail environment the user is near. In other embodiments, the user may manually open the mobile application and the GPS coordinates may be provided to the virtual account server for identification of the retail environment.

Once the mobile application receives the identity of the retail environment, the user may select a transit product and/or stored value to be loaded to the virtual account at block 220. The mobile application may communicate the selected product and/or amount to the mobile application server and/or transit back office, which may then provide a code to the mobile application 222. The code represents the amount and/or transit product that the user wishes to purchase, and indicates to the retail environment an amount to be tendered by the user to purchase the amount and/or transit product. Oftentimes, the code may be specific to a particular retailer or device, and may correspond to a retailer-specific SKU or other identifier of a product within a POS system. The code may be an alphanumeric identifier that may be read off a display of the mobile device and entered into a POS or other retail device. In other embodiments, the code may include a barcode, a QR code, or other visual indicator that may be scanned by a POS or other retail device. In yet other embodiments, the code may include a data packet that may be communicated to a POS device via a wireless communications interface, such as an NFC interface of the mobile device. Upon receiving the code, the retail environment may look up a SKU or other identifier associated with a particular transit product and/or stored value amount at block 224. The user may then tender payment to the retail environment at block 226, such as by providing a cash payment to a retail clerk or a cash-receiving slot of a retail device. Upon receiving the payment, the retail environment delivers a message to the payment service indicating that the payment was received at block 228. The payment service may then update the virtual account with the desired stored value amount or have it passed through to support a product sale at block 230. For example, the payment service may provide the funds to the transit system, which may then credit the user's transit account with the selected transit product.

In embodiments using physical transitcards, once the balance is supplied to the virtual account and/or passed to the transit account, the balance may be provided to the physical transit card in a number of ways. For example, the physical transit card may be a smartcard capable of NFC communication. The user may be prompted to tap the transit card against the mobile device, which may then transmit an update file to the transit card that contains the recently purchased transit product and/or stored value. In other embodiments, the virtual account server and/or transit system may transmit an autoload directive to one or more transit vending machines, access points, and/or other devices such that when the transit card is next used at one of these devices it is updated with the new balance or product. In other embodiments, the updated balance or product may be provided to the transit card through an NFC interface of the POS device or other retail device that is used to facilitate the cash transaction.

Once the virtual account is funded the user may use the virtual card residing on his mobile device (or a physical card) as a payment vehicle for the transit system. For example, the mobile application and/or transit system may generate a barcode, QR code, or data packet that may be scanned from the mobile device at a transit access point, such as a fare gate. In some embodiments, this may involve holding the barcode or QR code in front of a scanner to be read at the access point, while in other embodiments, the mobile device's NFC interface may transmit a data packet to the access point. Upon reading the code, the access point may allow the user to pass through, such as by moving a physical gate or other barrier, while also communicating an indication of the passage to one or both of the mobile application and virtual account server that allows the transaction to be deducted from the user's virtual account, such as by reducing a stored value balance by the cost of the current fare and/or by reducing a number of rides available on a transit pass. Alternatively, the user could purchase a fare product or stored value using the virtual account as a funding source. Such products, once purchased, are held in the transit account and debited at each validation of a registered piece of media (card, smart phone, bar code, etc.)

Once a prepaid account is created and registered, the user may opt to get a prepaid account payment credential for the prepaid account, such as an NFC payment card within a mobile wallet and/or may be a physical card, such as a mag stripe, contactless, and/or EMV plastic payment card. The payment credential is often a separate card from the transit card, and rather than accessing transit products associated with a transit account, the prepaid account payment credential may be linked to funds stored on the virtual prepaid account. The mobile application may also provide information on user benefits of such a prepaid account payment credential and an ordering mechanism for users wishing to obtain one. Once requested and delivered, the prepaid account payment credential may be used to drawn funds deposited into the virtual account to conduct transactions wherever the credential is accepted.

In some embodiments, the transit card, prepaid account payment credential, and/or or mobile application may be associated with a loyalty or rewards program. Offers and rewards may be published within the mobile applications. The offers may encourage users to make optimal commuter choices and/or participate with transit partners. When published, each offer may be accepted or declined by a user, with accepted offers being registered with a sponsoring entity as being procured by the publisher (the entity maintaining the mobile application). Upon joining the rewards program, the user may select one or more payment cards (virtual and/or physical) to link to the rewards program. If a linked card is used to conduct a transaction in concert with an accepted offer, the reward is then applied to the transaction. Such rewards may be used to drive usage of the virtual prepaid account and to incentivize users to request a payment credential that allows them to redeem such rewards.

Figure 3:
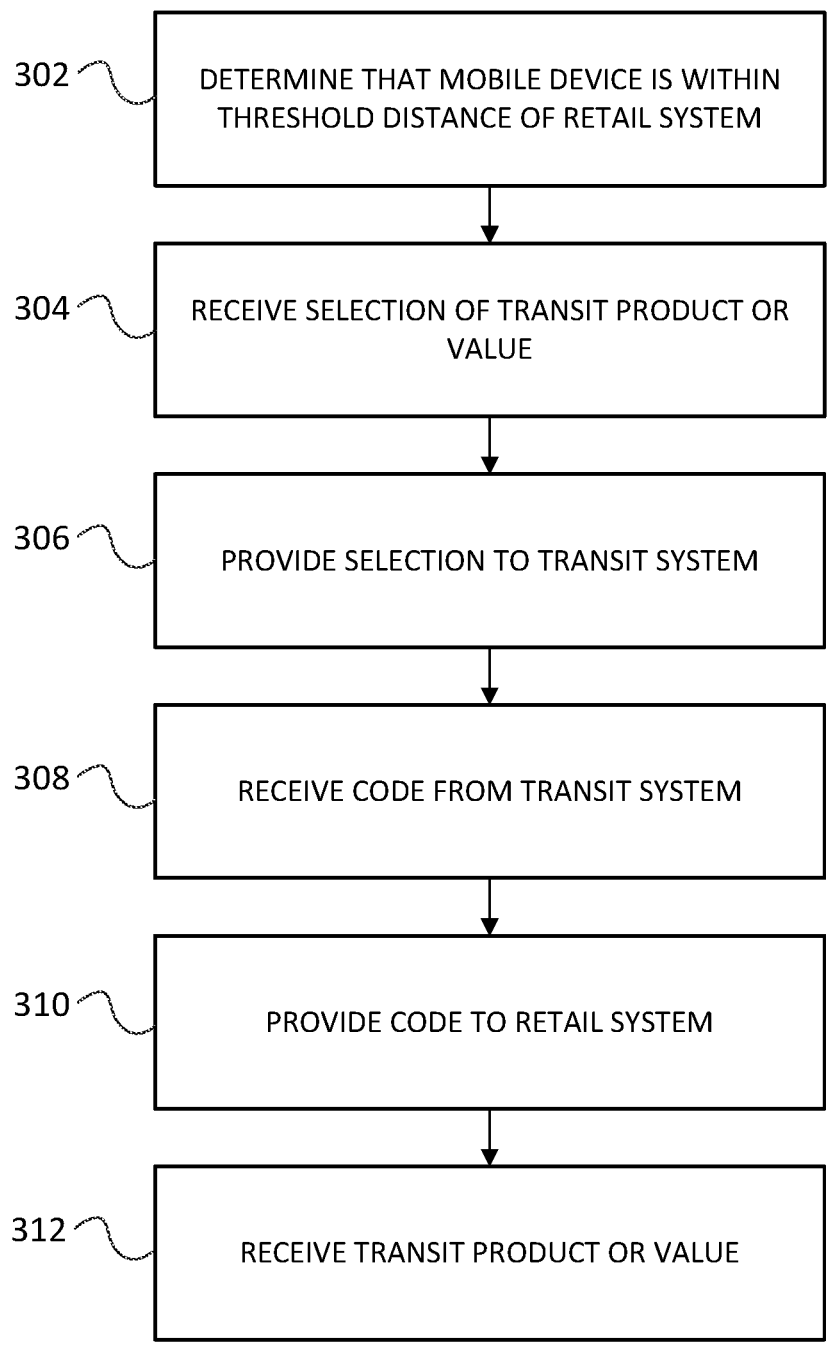
FIG. 3 is a flowchart depicting a process for facilitating bankless cash payments according to embodiments.

FIG. 3 is a flowchart of a process 300 for a method for facilitating bankless cash payments. Process 300 may be conducted by a mobile device, such as mobile device 102 described above. The user may download and install a mobile application that facilitates the virtual prepaid system on the mobile device. Once the application is installed, the user may be prompted to provide registration information, such as identity and/or payment information, to a virtual account server and/or transit server. This information may be used to generate a virtual prepaid account in which the user may deposit funds and/or transit products that may be accessed and used on the mobile device. Additionally, the information may be used to link a user's transit account with the virtual account such that transit products may be purchased and credited to the transit account using funds from the virtual account. Process 300 may begin with determining that a mobile device is within a threshold distance of a particular retail system at block 302. In some embodiments, this may include the mobile device detecting and/or communicating with a beacon positioned proximate to the retail system. For example, a POS device configured for use with a prepaid virtual account system may include a Bluetooth® beacon that may be detected by the user's mobile device when the user is in or near the retail establishment. The beacon may communicate an identifier of the POS device and/or the retail environment to help a mobile application of the mobile device identify the retail environment. In other embodiments, the mobile device may provide global positioning satellite coordinates to the transit system. The transit system may then determine which, if any, retail environments are nearby and return an indication of such a determination to the mobile device.

At block 304 a selection of a transit product or a stored value amount to be added to the virtual account is received. For example, the user may select an icon on a display of the mobile device that represents a particular transit product.

The user may also select a stored value amount by keying in an amount, selecting an icon representing a particular amount, and/or by adjusting a slider or other interface to select a particular amount. The selection may be provided to a transit system and/or other server, such as those described in FIG. 1, at block 306. For example, a communication with the selection may be sent to a transit server and/or virtual account server over a wireless network. At block 308, a code may be received from the transit system The code may be based on the selection and may represent an amount to be tendered to complete a transaction for the selection to be added to the virtual account. In some embodiments, the code may include one or more of a barcode, a QR code, and/or an alphanumeric identifier that is displayable on the mobile device. The code may be scanned using a reader of the retail device, such as using a barcode scanner of the POS device. In the case of an alphanumeric identifier, the code may be keyed into a device by the user and/or a retail clerk. In other embodiments, the code may include a data packet that is transmittable to the retail system using a near field communication interface of the mobile device. In some embodiments, the code may be selected based on the particular retail system. For example, the code may correspond with a SKU representing the selected transit product and/or stored value amount within the particular retail system's POS system.

At block 310 the code may be provided to the particular retail system. In some embodiments, the code may also include an identifier of the mobile device, virtual account, and/or the particular instance of the mobile application on the mobile device. In other embodiments, the identifier may be generated separately by the mobile device and/or mobile application and may be provided to the retail system separately from or concurrently with the code. The retail system may provide an indication to the prepaid network and/or transit system that informs the transit system that payment has been tendered for the selection. In some embodiments, the indication includes the identifier of the mobile device, virtual account, and/or the mobile application, thus allowing the transit system and/or prepaid network to easily identify a corresponding virtual account and/or transit account in which to deposit the requested funds or transit product. Upon the transit system receiving the indication, the transit product or the stored value amount may be received by the mobile device from the transit system at block 312. The received transit product or stored value amount may include one or both of an identifier that is displayable on the mobile device or a data packet that is transmittable using a near field communication interface of the mobile device. For example, the identifier may be a barcode, QR code, and/or alphanumeric identifier that may be read by an access point of a transit system. The received transit product or stored value amount may be downloaded from the transit system onto a memory of the mobile device where it may be stored for a subsequent use at an access point of a transit system.

Figure 4:
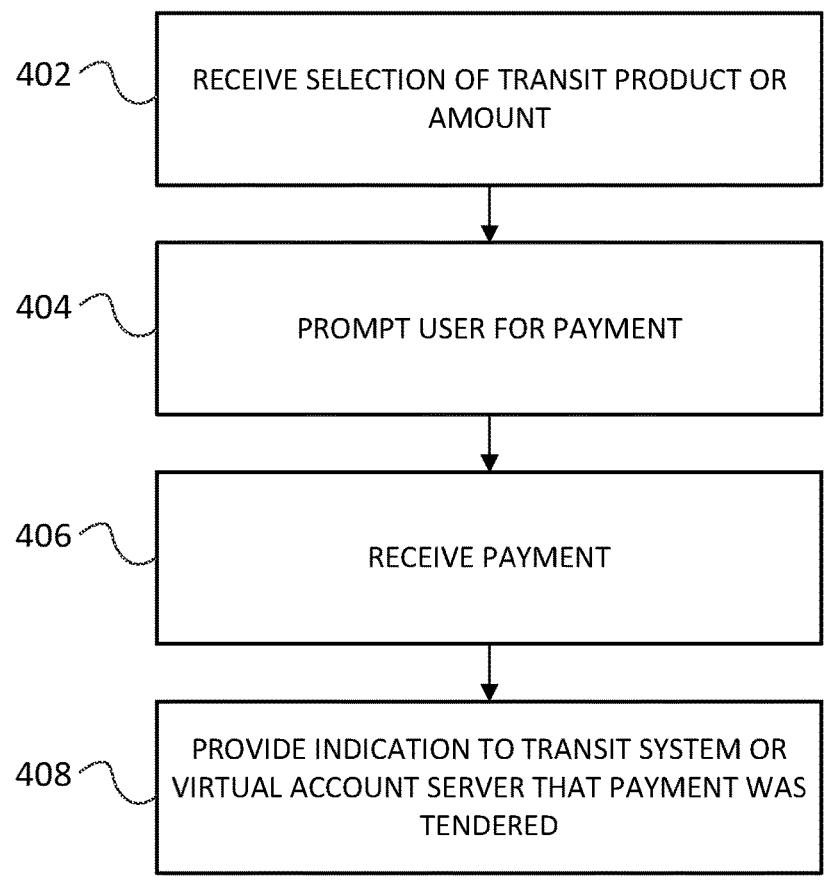
FIG. 4 is a flowchart depicting a process for facilitating bankless cash payments according to embodiments.

FIG. 4 is a flowchart of a process 400 for facilitating bankless cash payments. Process 400 may be conducted by a retail device, such as POS device or a kiosk. Process 400 may begin with receiving a selected product and/or stored value amount to be added to a virtual account of a mobile device at block 402. Receiving the selection may include receiving a code from the mobile device over an NFC interface, scanning a barcode or QR code from a screen of the mobile device, and/or keying in a code or other identifier that is displayed on a screen of the mobile device. The code may represent the product or amount, and may include an indication of an amount the user needs to tender to the retail establishment to complete the account loading transaction. Upon receiving the selection, the retail device may look up a corresponding product or amount within the retail system based on the code and prompt the user to provide a payment in the amount of the selection at block 404. The retail device may receive the payment at block 406. This may include a retail clerk accepting a cash payment and providing an input to the retail device indicating that the payment was received. In other embodiments, a user may insert cash into a cash and/or coin slot of the retail device. Upon scanning the cash and/or coins and/or otherwise determining that the proper amount was provided, the retail device may provide an indication to a transit server and/or virtual account server at block 408, which may then credit the user's virtual account and/or transit account with the stored value and/or transit product or pass through payment for the load of a transit product to the transit account.

Figure 5:
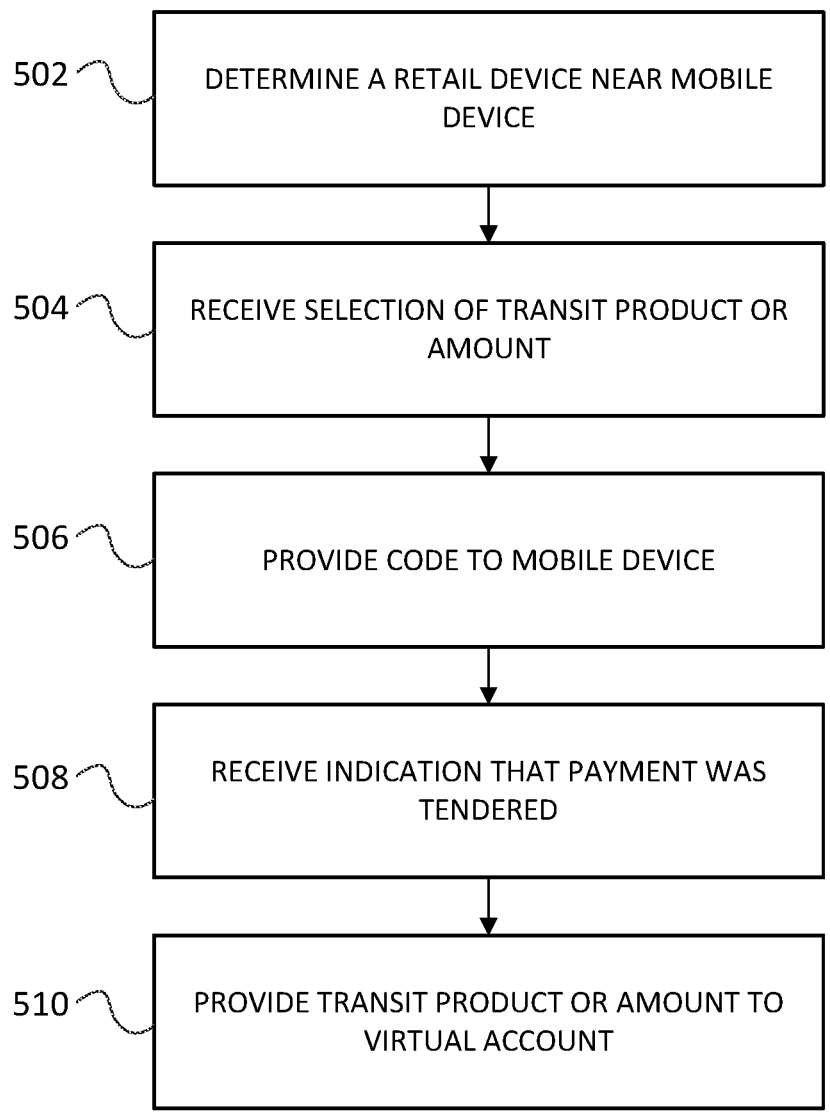
FIG. 5 is a flowchart depicting a process for facilitating bankless cash payments according to embodiments.

FIG. 5 is a flowchart of a process 500 for facilitating bankless cash payments Process 500 may be conducted by a server, such as a transit server, mobile wallet server, and/or issuer server. Process 500 may begin with determining a retail environment near a mobile device at block 502. This may be done, for example, by receiving GPS coordinates from a mobile device and comparing the coordinates to known locations of retail environments registered for use with a virtual prepaid account program. The identity of the retail environment may then be provided to a mobile application being executed on the mobile device. A selection of a transit product and/or stored value amount that the user wishes to add to a virtual account may be received at block 504. This selection may be used to generate and/or look up a corresponding code. The code may represent a particular product or stored value amount and may include a total amount to be tendered to receive the requested selection. The code may be communicated to the mobile device at block 506 such that the mobile device may in turn provide the code to a particular retail device. In some embodiments, the code may include and/or be communicated along with an identifier of the mobile device, mobile application and/or a virtual prepaid account. When the retail device receives sufficient payment, an indication may be sent to and received by transit server that the payment has been tendered at block 508. This indication may include the identifier. Upon receipt of the indication, the transit server may use the identifier to locate a proper virtual funding or transit account and credit the account with the selected transit product and/or stored value amount at block 510.

Figure 6:
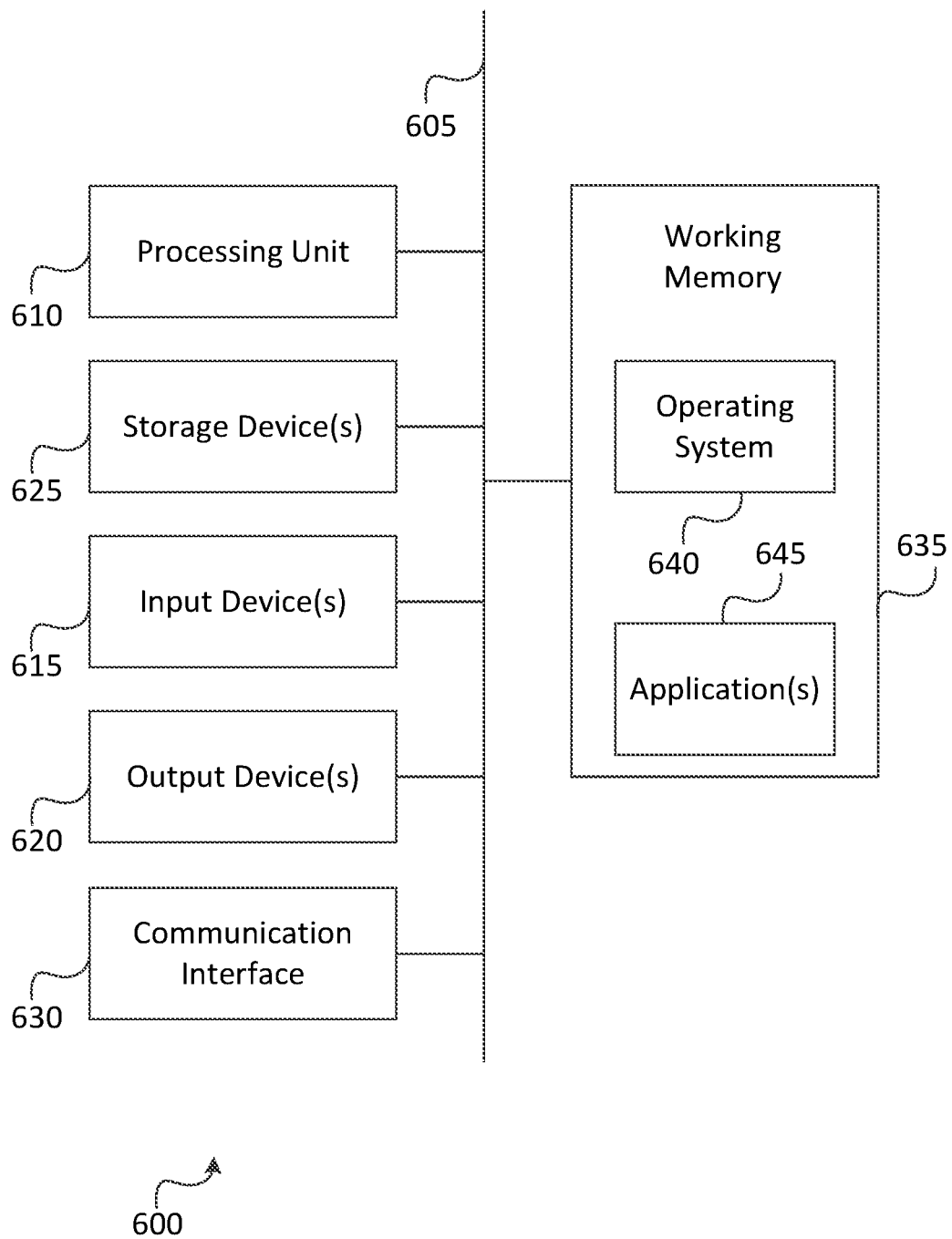
FIG. 6 depicts computer system according to embodiments.

A computer system as illustrated in FIG. 6 may be incorporated as part of the previously described computerized devices. For example, computer system 600 can represent some of the components of the retail devices, servers, and/or mobile devices described herein. FIG. 6 provides a schematic illustration of one embodiment of a computer system 600 that can perform the methods provided by various other embodiments, as described herein. FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include a processing unit 610, including without limitation one or more general-purpose processors and/or one or more special-purpose processors (such as digital signal processing chips, graphics acceleration processors, and/or the like); one or more input devices 615, which can include without limitation a keyboard, a touchscreen, receiver, a motion sensor, a camera, a smart-card reader, a contactless media reader, and/or the like; and one or more output devices 620, which can include without limitation a display device, a speaker, a printer, a writing module, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communication interface 630, which can include without limitation a modem, a network card (wireless or wired), an infrared communication device, a wireless communication device and/or chipset (such as a Bluetooth™ device, an 502.11 device, a Wi-Fi device, a WiMax device, an NFC device, cellular communication facilities, etc.), and/or similar communication interfaces. The communication interface 630 may permit data to be exchanged with a network (such as the network described below, to name one example), other computer systems, and/or any other devices described herein. In many embodiments, the computer system 600 will further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a general purpose computer (or other device) to a special purpose computer that is configured to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 610, applications 645, etc.) Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processing unit 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processing unit 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processing unit 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communication interface 630 (and/or the media by which the communication interface 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a non-transitory storage device 625 either before or after execution by the processing unit 610.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A method for facilitating bankless cash payments, the method comprising:
    determining that a mobile device is within a threshold distance of a particular retail system;
    receiving a selection of a transit product or a stored value amount to be added to the virtual account;
    providing the selection to a transit system;
    receiving, from the transit system, a code based on the selection, wherein the code comprises an amount to be tendered for the selection to be added to the virtual account;
    providing the code to the particular retail system causing a virtual account to be funded with the selected transit product or the stored value amount, wherein:
        the particular retail system is configured to accept cash payments;
        the virtual account is funded upon the transit system receiving an indication from the retail system that a cash payment for the amount was tendered for the selection; and
        tendering the cash payment does not require any separate account data to be provided to the particular retail system or the transit system;
    receiving the transit product or the stored value amount on the mobile device from the transit system, wherein the transit product or the stored value amount is received after the virtual account has been funded using the cash payment; and
    providing, by the mobile device, an input to an access point of the transit system, the input causing a change in physical state of a component of the access point.

2. The method for facilitating bankless cash payments of claim 1, wherein:
    determining that the mobile device is within the threshold distance comprises communicating with a beacon proximate to the retail system.

3. The method for facilitating bankless cash payments of claim 1, wherein:
    determining that the mobile device is within the threshold distance comprises:
        providing the mobile device's global positioning satellite coordinates to the transit system; and
        receiving an indication that the mobile device is proximate to the particular retail system from the transit system, the indication being based on the global positioning satellite coordinates.

4. The method for facilitating bankless cash payments of claim 1, further comprising:
    providing registration information associated with a user of the mobile device to the transit system for creating the virtual account.

5. The method for facilitating bankless cash payments of claim 1, wherein:
    the code comprises one or more of a barcode, a QR code, or an alphanumeric identifier that is displayed on the mobile device.

6. The method for facilitating bankless cash payments of claim 1, wherein:
    the code comprises a data packet that is transmittable to the retail system using a near field communication interface of the mobile device.

7. The method for facilitating bankless cash payments of claim 1, wherein:
    the received transit product or stored value amount comprise one or both of an identifier that is displayable on the mobile device or a data packet that is transmittable using a near field communication interface of the mobile device; and
    the received transit product or stored value amount is downloaded from the transit system onto a memory of the mobile device.

8. A non-transitory computer-readable medium having instructions embedded thereon for facilitating bankless cash payments, the instructions comprising computer code for causing a computing device to:
    determine that a mobile device is within a threshold distance of a particular retail system;
    receive a selection of a transit product or a stored value amount to be added to the virtual account;
    provide the selection to a transit system;
    receive, from the transit system, a code based on the selection, wherein the code comprises an amount to be tendered for the selection to be added to the virtual account;
    provide the code to the particular retail system causing a virtual account to be funded with the selected transit product or the stored value amount, wherein:
        the particular retail system is configured to accept cash payments;
        the virtual account is funded upon the transit system receiving an indication from the retail system that a cash payment for the amount was tendered for the selection; and
        tendering the cash payment does not require any separate account data to be provided to the particular retail system or the transit system;
    receive the transit product or the stored value amount on the mobile device from the transit system, wherein the transit product or the stored value amount is received after the virtual account has been funded using the cash payment; and
    provide an input to an access point of the transit system, the input causing a change in physical state of a component of the access point.

9. The non-transitory computer-readable medium of claim 8, wherein:
    determining that the mobile device is within the threshold distance comprises communicating with a beacon proximate to the retail system.

10. The non-transitory computer-readable medium of claim 8, wherein:
  determining that the mobile device is within the threshold distance comprises:
    providing the mobile device's global positioning satellite coordinates to the transit system; and
    receiving an indication that the mobile device is proximate to the particular retail system from the transit system, the indication being based on the global positioning satellite coordinates.

11. The non-transitory computer-readable medium of claim 8, further comprising instructions for causing the computing device to:
  provide registration information associated with a user of the mobile device to the transit system for creating the virtual account.

12. The non-transitory computer-readable medium of claim 8, wherein:
  the code comprises one or more of a barcode, a QR code, or an alphanumeric identifier that is displayed on the mobile device.

13. The non-transitory computer-readable medium of claim 8, wherein:
  the code comprises a data packet that is transmittable to the retail system using a near field communication interface of the mobile device.

14. The non-transitory computer-readable medium of claim 8, wherein:
  the received transit product or stored value amount comprise one or both of an identifier that is displayable on the mobile device or a data packet that is transmittable using a near field communication interface of the mobile device; and
  the received transit product or stored value amount is downloaded from the transit system onto a memory of the mobile device.

15. A mobile device for facilitating bankless cash payments comprising:
  a display;
  a communications interface;
  a memory; and
  a processor configured to:
    determine that a mobile device is within a threshold distance of a particular retail system;
    receive, using the communications interface, a selection of a transit product or a stored value amount to be added to the virtual account;
    provide, using the communications interface, the selection to a transit system;
    receive, from the transit system using the communications interface, a code based on the selection, wherein the code comprises an amount to be tendered for the selection to be added to the virtual account;
    provide, using the communications interface, the code to the particular retail system causing a virtual account to be funded with the selected transit product or the stored value amount, wherein:
      the particular retail system is configured to accept cash payments;
      the virtual account is funded upon the transit system receiving an indication from the retail system that a cash payment for the amount was tendered for the selection; and
      tendering the cash payment does not require any separate account data to be provided to the particular retail system or the transit system;
    receive, using the communications interface, the transit product or the stored value amount on the mobile device from the transit system, wherein the transit product or the stored value amount is received after the virtual account has been funded using the cash payment; and
    provide an input to an access point of the transit system, the input causing a change in physical state of a component of the access point.

16. The mobile device for facilitating bankless cash payments of claim 15, wherein:
  determining that the mobile device is within the threshold distance comprises communicating, using the communications interface, with a beacon proximate to the retail system.

17. The mobile device for facilitating bankless cash payments of claim 15, wherein:
  determining that the mobile device is within the threshold distance comprises:
    detecting, using a global positioning satellite sensor of the mobile device, coordinates of the mobile device;
    providing, using the communications interface, the coordinates to the transit system; and
    receiving, using the communications interface, an indication that the mobile device is proximate to the particular retail system from the transit system, the indication being based on the coordinates.

18. The mobile device for facilitating bankless cash payments of claim 15, wherein the processor is further configured to:
  provide, using the communications interface, registration information associated with a user of the mobile device to the transit system for creating the virtual account.

19. The mobile device for facilitating bankless cash payments of claim 15, wherein:
  the code comprises one or more of a barcode, a QR code, or an alphanumeric identifier that is displayed on the mobile device.

20. The mobile device for facilitating bankless cash payments of claim 15, wherein:
  the received transit product or stored value amount comprise one or both of an identifier that is displayable on the mobile device or a data packet that is transmittable using a near field communication interface of the mobile device; and
  the received transit product or stored value amount is downloaded from the transit system onto the memory.

* * * * *